United States Patent [19]
Moorehead et al.

[11] Patent Number: 5,470,465
[45] Date of Patent: Nov. 28, 1995

[54] VORTEX SYSTEM FOR SEPARATING PARTICLES FROM A LIQUID STREAM

[75] Inventors: Jack Moorehead; Michael Maung, both of San Diego, Calif.

[73] Assignee: Automatic Control Technology Inc., San Diego, Calif.

[21] Appl. No.: 254,397

[22] Filed: Jun. 6, 1994

Related U.S. Application Data

[63] Continuation-in-part of Ser. No. 188,092, Jan. 28, 1994, Pat. No. 5,451,318.
[51] Int. Cl.$^6$ .................................................. B03D 1/74
[52] U.S. Cl. .................. 210/205; 210/208; 210/221.2; 210/223; 210/512.1; 210/512.3; 210/748; 95/226; 209/12.2; 209/34; 209/730; 209/731
[58] Field of Search .................. 55/256, 459.1, 55/459.2, 459.3, 459.4; 95/226, 271; 204/730, 731, 12.2, 39, 199; 210/188, 219, 220, 221.2, 512.1, 512.2, 512.3, 223, 748, 205, 208, 198.1

[56] References Cited

U.S. PATENT DOCUMENTS

| | | | |
|---|---|---|---|
| 4,279,743 | 7/1981 | Miller | 210/220 |
| 5,009,796 | 4/1991 | Petrik et al. | 210/512.3 |
| 5,028,318 | 7/1991 | Aslin | 210/512.1 |
| 5,224,604 | 7/1993 | Duczmal et al. | 210/221.2 |

*Primary Examiner*—Robert A. Dawson
*Assistant Examiner*—David Reifsnyder
*Attorney, Agent, or Firm*—John R. Duncan; Frank D. Gilliam

[57] ABSTRACT

A vortex system for separating particles of varied size and density from a liquid stream. A particle bearing liquid is introduced tangentially into one end of an elongated cylindrical chamber to form a rotating liquid vortex therein. An impeller at one end of the chamber reinforces the vortex flow. Either a series of tangentially oriented jets introducing a gas or a gas saturated liquid through the chamber wall or a rotating central chamber section further increases the vortex rotational flow. The vortex produces a heavy particle rich outer region, a gas and light particle rich axial region and a cleaned liquid annular region therebetween. The cleaned liquid flows out of the chamber through an outlet at the chamber end opposite end at which the particle bearing liquid is introduced. The heavy particles in the outer region and the gas and light particles in the axial region are each removed through an outlet. A variety of component orientations and auxiliary devices may be used to optimize system operation.

54 Claims, 5 Drawing Sheets

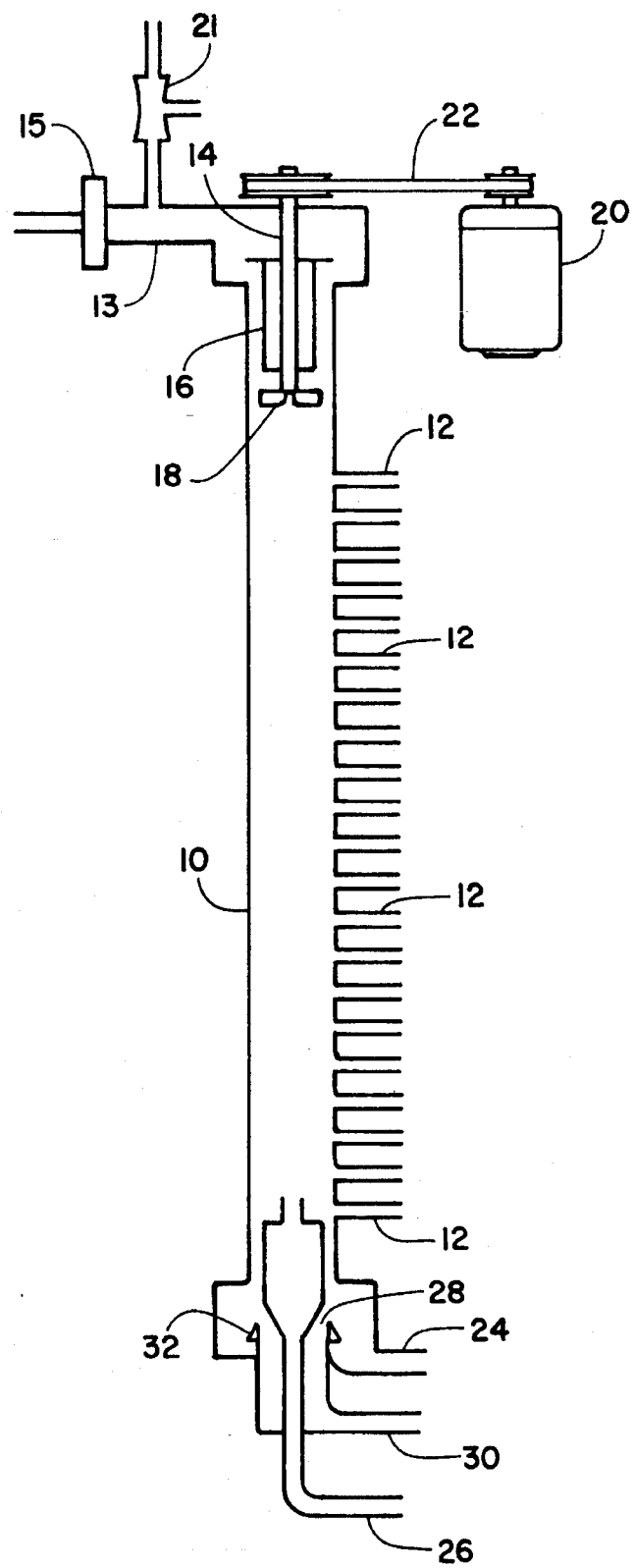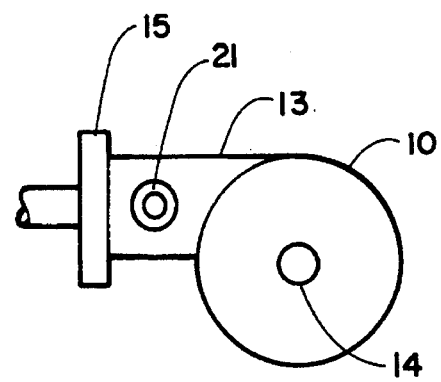
FIGURE 1
FIGURE 2

VORTEX SYSTEM FOR SEPARATING PARTICLES FROM A LIQUID STREAM

This is a continuation-in-part of application Ser. No. 08/188,092, filed Jan. 28, 1994, now U.S. Pat. No. 5,451, 318.

BACKGROUND OF THE INVENTION

This invention relates in general to systems for removing contaminants from liquids and, more specifically to a system for removing particles, both large or heavy particles and light, fine or buoyant particles from a liquid stream.

Water supplies for domestic drinking water, process water for chemical plants or other liquids are often contaminated with both large, heavy particles and fine, light, buoyant particles. These particles must be removed in a reliable, cost effective manner.

Many older water treatment plants use gravitational separation methods, typically in sedimentation systems or dual-media sand filtration systems that may not be acceptable under the newer water quality standards. In some cases, these systems can meet the standards through the use of properly mixed polymer chemical filter aids. The required expensive and complex polymer chemical mixing equipment requires constant attention, since the amount of the chemicals being added to raw water must be frequently readjusted to match the continually changing chemistry of the water being filtered. Slow sand filters require a considerable investment, but generally can be operate for longer periods without cleaning. Unfortunately, even with pretreatment, both dual-media and slow sand filters fail to meet water quality standards for hours or several days after each backwash cleaning. Contaminates have been found to pass through a sand filter whenever water flow rates are changed and whenever the pump is stopped and turned on again. In order to meet standards, it may be necessary to pump filtered water to waste after every backwash cycle, disposing of thousands of gallons of water, until the filter "ripens" or compacts. Thus, these filter systems are less than desirable for use today.

Particulate material has also been removed from liquids by floatation, another gravitational method, in which bubbles of a gas, such as air or oxygen, are introduced into the lower levels of the liquid and float to the top, carrying fine particles with them. Flotation is a gravitational method because the rise of bubbles is due to the gravitational acceleration acting on the mass of the liquid in accordance with the basic force equals mass time acceleration relationship. A force balance relative to a pocket of gas phase within liquid (a bubble), where the mass of the bubble is its volume times its density, shows that the bubble must rise to find equilibrium, because the density of a gas is generally less than that of a liquid.

Gravitational methods for separation of particles from a liquid, such as water, are particularly inefficient where the particles to be removed are close in density to water or so small that they remain suspended for very long periods of time. The requires a very large storage volume for a filter or floatation system to process large volumes of liquid.

Ozone, oxygen or air are sometimes mixed with water or other liquids to oxidize suspended solids, in particular organic contaminants. In conventional ozone contact chambers, the ozone gas is applied at the base of a tall column. The ozone-oxygen bubbles float to the surface slowly, their upward movement slowed by the downward counter flow of the water stream. To achieve sufficient contact time before the water passes from the mixing column, the column must be extremely tall and is difficult to install in ordinary sized plant equipment rooms. The concentration of dissolved ozone-oxygen is undesirably diluted in the larger vertical columns. While ozone-oxygen contact in mixing chambers is generally effective, there is a need for improved mixing in smaller mixing vessels.

Cyclone separators are often used to separate heavy particulate material from liquids such as water. Typical of such cyclone systems is that described by Laval in U.S. Pat. No. 3,568,837. In such separators, a fluid stream is directed at high velocity into a cylindrical tank at an angle that cause the fluid to rotate at high speed, driving entrained particles to the wall from which the particles move downward into a conical tank bottom with a central valve for removing the collected particles. The liquid is removed from the center top of the tank. However, conventional cyclone suspended solids separators only remove heavy particles, with any entrained gases and light or buoyant particles remaining in the exiting fluid stream.

A version of the cyclone type separator, called the hydrocyclone as originally described by Miller in U.S. Pat. No. 4,279,743 uses a cylindrical chamber having a mesh wall through which air is introduced into a rotating mixture of water and fine mineral particles. Bubbles are generated to which fine particles adhere. Bubbles and fine particles pass through an overflow outlet and water with heavy particles pass out through an underflow outlet. While effective in fine mineral separation, this device is not capable of separating both fine, light particles and dense, heavy particles from the liquid to clean the liquid. Further, since only inlet velocity cause the vortex to form and the very rough mesh surface exerts considerable drag on the rotating vortex; the mesh reduces vortex velocity and efficiency. Further, large amounts of heavy, large particles tend to clog the mesh surface.

Thus, there is a continuing need for a separation system that can rapidly and efficiently remove particles from liquids while treating a liquid, and can efficiently separate entrained gases and light or buoyant particles from the liquid in addition to heavy particles.

SUMMARY OF THE INVENTION

The above noted problems, and others, are overcome by a particle separation system using centrifical velocity fields to generate centripetal forces on the influent particle bearing liquid that are many times greater than the forces associated with gravitational acceleration to separate the influent into three effluent streams, an outerflow containing larger and higher density particles, an annular flow containing liquid substantially free of particles and a central flow containing light, buoyant, or very fine particles. This system can separate solid particles from liquids, colloidal liquid particles in an immiscible liquid phase, etc.

While in some cases the separation chamber may be operated in a horizontal or some other plane, it preferably is arranged substantially vertically. The chamber is elongated and preferably has a circular cross section, with a preferred length to diameter ratio of at least 4. An optimum length to diameter ratio is from about 12 to 15.

An axial impeller, driven by an electric motor or the like, is provided near one end of the chamber to aid in maintaining the vortex flow. Influent liquid is directed into one end of the chamber at a tangential angle to the chamber diameter.

The influent liquid may contain gas bubbles, or may be saturated with a gas under pressure to aid in generating gas bubbles in the liquid in the chamber, as desired. Further, a venturi may be provided at the influent entry line for mixing air or other gas into the influent liquid flow.

A plurality of injection jets are provided at selected locations along and through the length of the outer wall of the chamber for introducing air, another selected gas or a gas-saturated liquid under a pressure higher than the pressure within the chamber. Jets may be provided at any suitable locations around the circumference and along the length of the chamber. These jets are preferably oriented to direct the fluid being introduced in a tangential direction to aid in maintaining the vortex flow of liquid in the chamber. The jets may be either separate nozzles inserted in openings in the chamber wall having suitable fine holes or fine holes directly formed at the desired tangential angle in the wall of the chamber, such as by conventional laser drilling. In the case of nozzles, the entire nozzles may be oriented in the preferred tangential direction, or the fine holes in the nozzle outlet may be formed in the desired direction Preferably, each jet will have a flow rate of from about 0.5 to 0.7 gallons per minute. For optimum results, at least 1 jet will be provided per lineal inch of the separator system length, at least in the central section spaced from the influent and affluent assemblies. The total flow through the jets will range from about 1 to 50 per cent of the process stream flow (including the main influent flow). While any suitable jet pattern and inlet flow direction may be used, the insertion angle will preferably be parallel to a tangent to the inner chamber surface with the injected liquid moving in the same direction as the vortex flow.

Any suitable jet nozzle configuration may be used with gas or saturated liquid. Typical saturated liquid nozzles are described by Rykaart et al. in the paper "Behavior of Air Injection Nozzles in Dissolved Air Flotation", Proceedings of the IAWQ-IWSA-AWWA Joint Specialized Conference on Flotation Processes in Water and Sludge Treatment, Orlando Fla., 26–28 April 1994. A piezo electric or ultrasonic actuator may advantageously used near the tip of a jet nozzle to aid in producing smaller bubbles.

Opposite the influent entry end of the chamber are provided an effluent line for carrying away the outerflow from the chamber interior periphery, containing heavy or high density particles and an annular effluent line for carrying away cleaned liquid from an annular region of the chamber, between the outer heavy particle region and the central fine or low density particle region. An effluent line for removing the mixture of buoyant, light or fine, particles and gas from the axial region of the chamber is provided at one end of the chamber.

Flow of influent liquid and effluent liquids in the chamber may be either co-current or counter current, as desired.

In one preferred co-current flow arrangement, the influent particle-bearing liquid enters tangentially into the top of the chamber, with an impeller near the top of the chamber reinforcing the vortex flow. The influent passes downwardly separating into three regions, an outer region enriched in heavy large particles, a central region enriched in the gas (generally forming a froth) and light, fine and buoyant particles and an annular region between the outer and central regions which is significantly reduced in particle concentration, often substantially free of particles. Heavy particles in the outer region move down the chamber wall and exit through the heavy particle outflow. The light particles and gas exit through the axial outflow line. The cleaned liquid exits through the annular outflow line.

A second preferred embodiment of a co-current particle separation system operates generally similarly to the first system, described above, but has the liquid influent and impeller at the bottom of the chamber and the three outflow lines at the top.

A preferred embodiment of a counter current separator system has the impeller and the outflow lines for the outer, heavy particle region and for the annular, cleaned liquid, at the bottom and the particle bearing influent entering at the top and having the outflow for the central, fine, light, buoyant particle and gas froth at the top.

While a generally cylindrical chamber is preferred, in some cases upper and/or lower sections having greater diameters such as a rounded "barbell" shapes having rounded walls tapering inwardly toward a narrower central section, or conical sections with apexes toward the center may have significant advantages in specific applications.

In some cases, the use of piezoelectric or ultrasonic transducers may be advantageously incorporated into the tips of the jets along the chamber to produce smaller bubbles. Further, an electrochemical gas phase production device along the inner wall of the chamber may be used advantageously in producing small bubbles all along the chamber interior wall.

With mineral or other large particles that have magnetic properties, magnets along the chamber wall may be used to increase the separation of such particles. For example, an electromagnet may be used to draw such particles to the outer region, then turned off to allow the particles to move downwardly to the heavy particle outflow line.

If desired, to increase the rotation of the vortex within the separation chamber, one or more offset recirculating pumps may be used. The pump will be arranged adjacent to the chamber, with the pump inlet and outlets penetrating the chamber wall tangentially to the wall so that both the drawing of liquid from the chamber and the return of the liquid will increase the vortex forces.

To further increase the vortex within the chamber, in place of the jets for directing gas or liquid into the side of the chamber, a center section may be made rotatable relative to the end sections. The rotating center section will entrain liquid through friction and increase the vortex.

For maximum particle separation batteries of such separation chambers may be used, in series or parallel for optimum overall efficiency. Further, ozone may be introduced with the influent liquid and the clean, annular region, liquid may be passed through additional high-efficiency filter systems.

BRIEF DESCRIPTION OF THE DRAWING

Details of the invention, and of preferred embodiments thereof, will be further understood upon reference to the drawing, wherein:

FIG. 1 is a schematic elevation view, partially in section, of a first embodiment of a co-current particle separation system;

FIG. 2 is a schematic detail plan view of the system of FIG. 1;

DETAILED DESCRIPTION OF PREFERRED EMBODIMENTS

Figures 3, 4:
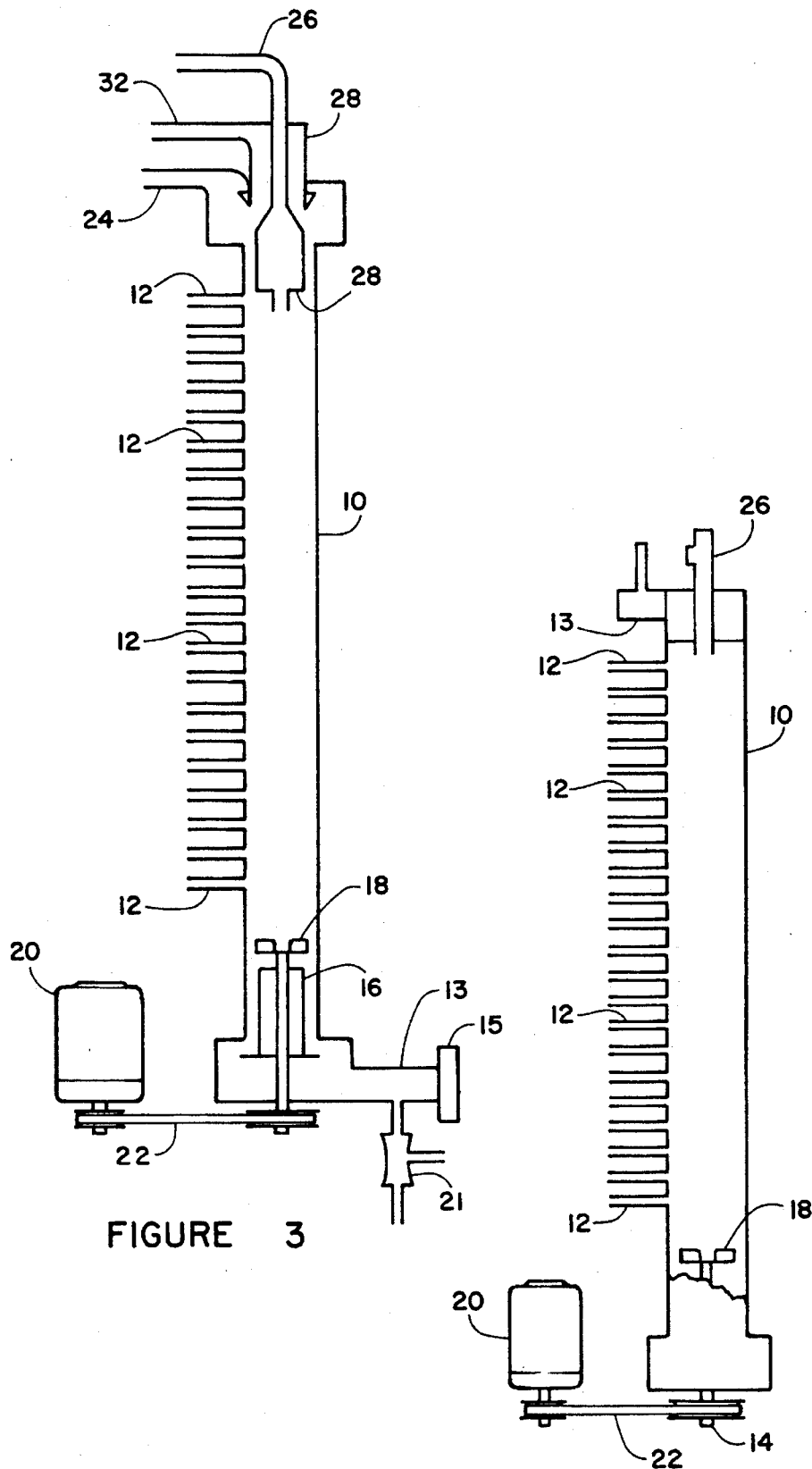
FIG. 3 is a schematic elevation view, partially in section, of a second embodiment of a co-current particle separation system.
FIG. 4 is a schematic elevation view, partially in section, of a of a counter-current particle separation system.

A preferred embodiment of a co-current system in which influent enters at the top of chamber 10 and all outflows leave at the bottom of the chamber is shown in FIGS. 1 and 2.

A particle bearing liquid, such as water from a lake or well to be treated to potable water standards, is directed into chamber 10 through an inlet 13. If desired, the liquid may contain a gas, such as air, oxygen or the like, under pressure so that the gas nucleates and forms small bubbles after entering chamber 10. Any conventional gas mixing chamber 15 may be used. As shown in the schematic plan view of FIG. 2, inlet 10 enters at an angle tangential to chamber 10 to establish a rotating vortex in the water column within chamber 10.

A shaft 14, with suitable seals to prevent leakage, enters chamber and is supported for rotation on support 16. An impeller 18 is mounted on shaft 14 for rotation therewith. Shaft 14 is rotated by motor 20. Impeller 18 is rotated in the same direction as the vortex generated by the influent liquid, so as to reinforce the vortex.

If desired, a conventional venturi 21 may be provided to entrain air in a liquid passing through the venturi and mix that air with the influent liquid to add further bubbles to the liquid in chamber 10.

A plurality of inlet jets 12 for directing a gas, such as air, a gas saturated liquid under pressure or the like into chamber 10 are provided at selected locations along the chamber, as detailed above. A gas may be directly introduced into the chamber to form small bubbles. Alternatively, a saturated liquid containing a gas under high pressure may be introduced through jets 12, to form bubbles spontaneously as the saturated liquid enters the lower pressure chamber.

As described above, the vortex causes separation of the rotating liquid mass into three regions, an outer region containing heavy, large, particles, an axial region containing light, fine, buoyant particles and gas and a clean liquid annular region therebetween. Heavy particles move downwardly along the inner wall of chamber 10 and exit with a small amount of liquid through heavy particle outflow line 24. The mixture of gas and light particles, generally in the form of a froth, passes down the center of chamber 10 and exits with a small amount of liquid through air outflow line 26. The cleaned liquid in the annular region moves down adjacent to the chamber wall and out annular receiver 28 to annular outflow line 30. Baffles 32 around the edge of annular receiver 28 aid in separating heavy particles from the cleaned liquid.

The heavy particles from line 24 and froth from line 26 are generally passed to waste while the cleaned liquid from line 30 is passed to further treatment facilities, such as filters, post treatment systems and the like, then put into use.

A second co-current flow embodiment is shown in FIG. 3. Chamber 10 and jets 12 are basically the same as in FIG. 1. Here, the particle bearing liquid enters at the bottom of chamber through a tangential line 13 as in FIG. 1. The assembly of shaft 14, support 16, impeller 18, motor 20 and belt 22 are basically the same as in FIG. 1, except that assembly is now mounted at the bottom of chamber 10.

The heavy particle outer region along the inner wall of chamber 10 is forced and swept upwardly and out through heavy particle outflow line. The axial mixture of light particles and gas passes axially up the center of chamber and out through axial air outflow line 26. The cleaned liquid in the annular region passes up and out through annular receiver 28 to annular outflow line 30, past baffles 32. This upward flow arrangement has advantages in providing multiple locations for heavy particle removal.

Figure 5:
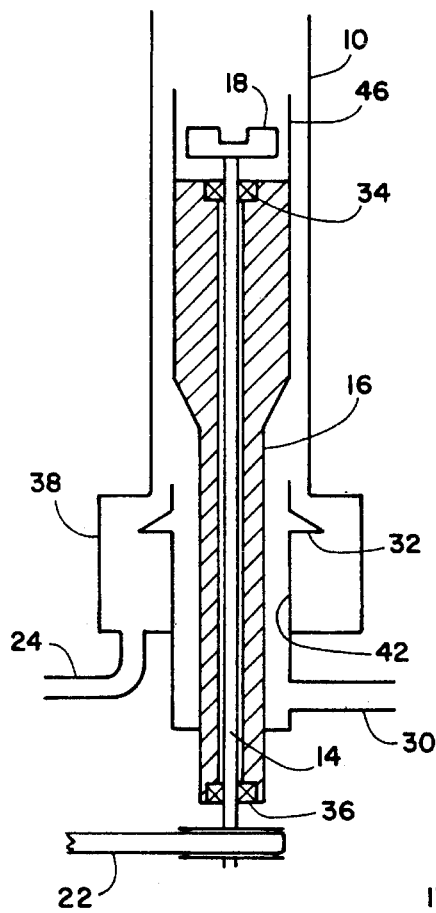
FIG. 5 is a schematic detail elevation view, partially in section, of the impeller and lower outflow section of the embodiment of FIG. 3.

FIGS. 4 and 5 provide schematic representations of third embodiment of the separator of this invention; in this case, a counter flow arrangement. In this embodiment, influent particle carrying liquid enters tangentially through inlet 13 at the top of chamber 10 to establish a vortex. Jets 12, operating as described above, add to the vortex and to gas bubbles in the liquid.

The assembly of shaft 14, support 16, impeller 18, motor 20 and belt drive 22 are basically the same as described above. Impeller 18, as before, reinforces the vortex within chamber 10.

The axial mixture of gas and small, fine and buoyant particles in this case moves counter current to the liquid flow, exiting through air outlet line 26 at the top of chamber 10.

Details of the impeller assembly and the other outflow arrangements are provided in FIG. 5. Impeller 18 is mounted on shaft 14 which passes outside the chamber to belt drive 22. Seals 34 and 36 prevent leakage of liquid around shaft 14. Heavy particles moving downwardly along the inner wall of chamber 10 under gravity forces and the downward flow of liquid, move along the wall into housing 38 and out through heavy particle outflow line 24 with a selected quantity of liquid. The cleaned liquid in the annular region moves downwardly between the exterior of impeller shroud 40 and the heavy particles, into housing 42 and out through annular outflow line 30. Baffles 32 aid in directing heavy particles in to housing 38.

If desired, impeller shroud 40 may be made slidably adjustable in a vertical direction where it passes through a conventional seal 43 through the base 44 of housing 42. Similarly, the width of shroud 40 and the height of the edges 46, which serves to limit turbulence between the shroud 40 and the inner wall of chamber 10, above impeller 18 could be made adjustable so as to permit the assembly to be "tuned" for optimum operation and most accurate separation of the different regions.

Figure 6:
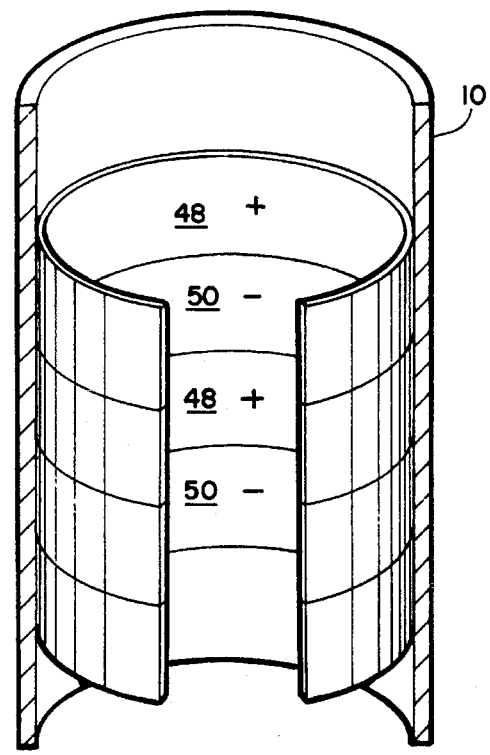
FIG. 6 is a schematic detail of an electrochemical gas generation embodiment.

FIG. 6 is a detail flow schematically showing another means for generating small gas bubbles within the liquid in chamber 10 where the liquid is water or another suitable liquid. Closely spaced positively charged bands 48 and negatively charged bands 50 could be used to electrochemically decompose water into hydrogen and oxygen bubbles or other suitable liquid into gaseous components. These bubbles would act, with the bubbles produced by the other means described, to carry fine, light and buoyant particles into the axial region and out of the chamber.

Figure 7:
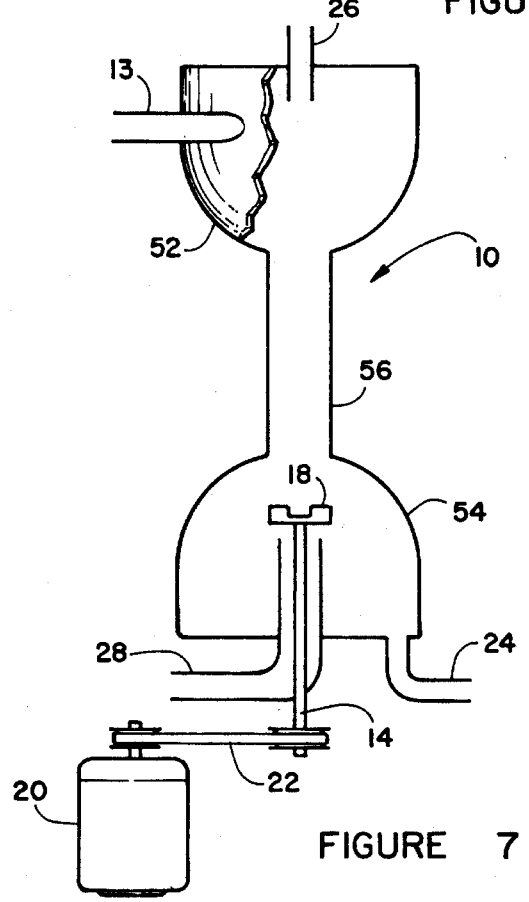
FIG. 7 is a schematic elevation view of a second counter current embodiment of the system separation chamber.

While the cylindrical configuration of chamber 10 as shown in FIGS. 1, 3 and 4 is generally preferred, other configurations may have advantages with different conditions and particles. FIG. 7 shows a configuration in which chamber 10 includes a downwardly rounded dome portion 52 and an upwardly rounded dome portion 54, separated by a short cylindrical portion 56. Other components of the system are very approximately shown to illustrate the relationship of components. The chamber 10 of FIG. 7 could be used with any of the inlet, impeller and outlet embodiments as shown in FIGS. 1, 3 and 4.

Figure 8:
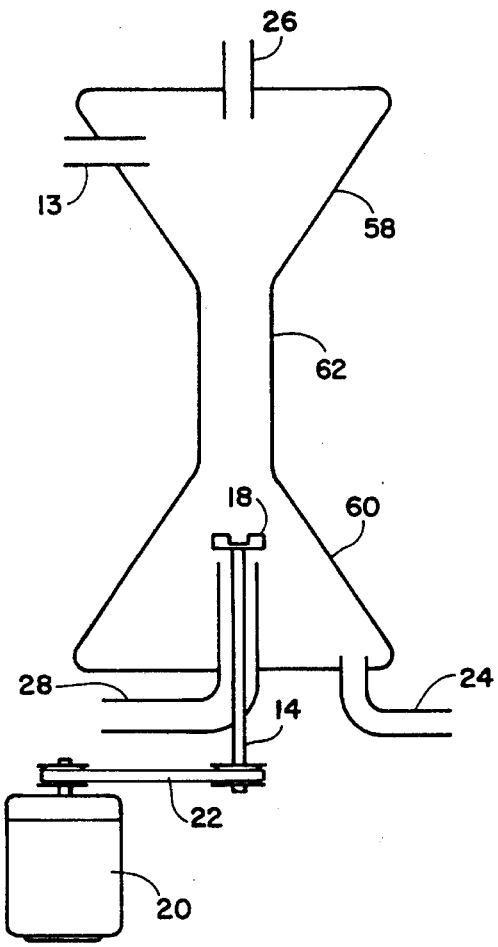
FIG. 8 is a schematic elevation view of a third counter current embodiment of the system separation chamber.

FIG. 8 shows an arrangement in which chamber 10 includes a conical portion 58 and 60, oriented with apexes toward each other and connected to short cylindrical portion 62. Other components of the system are very approximately shown to illustrate the relationship of components. The chamber 10 of FIG. 7 could be used with any of the inlet, impeller and outlet embodiments as shown in FIGS. 1, 3 and 4.

The embodiments of FIGS. 7 and 8 have advantages of changing velocity profiles as may be desirably with different liquids.

Figure 9:
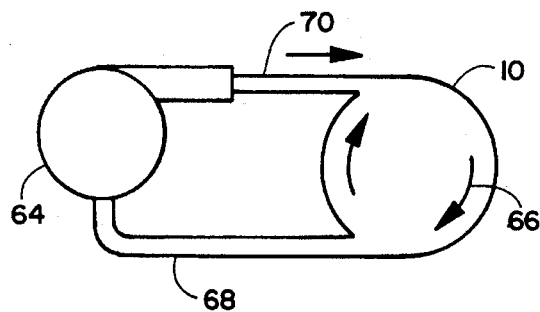
FIG. 9 is a schematic transverse section view through the separation chamber, showing use of an offset recirculating pump.

FIG. 9 shows in a schematic transverse section through chamber 10 (as seen in FIGS. 1, 3 or 4, or the cylindrical section 56 or 62 in FIGS. 7 and 8, respectively) with an offset recirculating pump 64 connected to the chamber. The vortex within chamber 10 is rotating in the direction indicated by arrow 66. The pump suction line 68 draws liquid from chamber 10 tangentially in the direction of vortex rotation. Return line 70 directs high pressure flow from pump 64 back to chamber 10 tangential to the vortex flow. Thus, both suction and return serve to reinforce vortex rotation.

Figure 10:
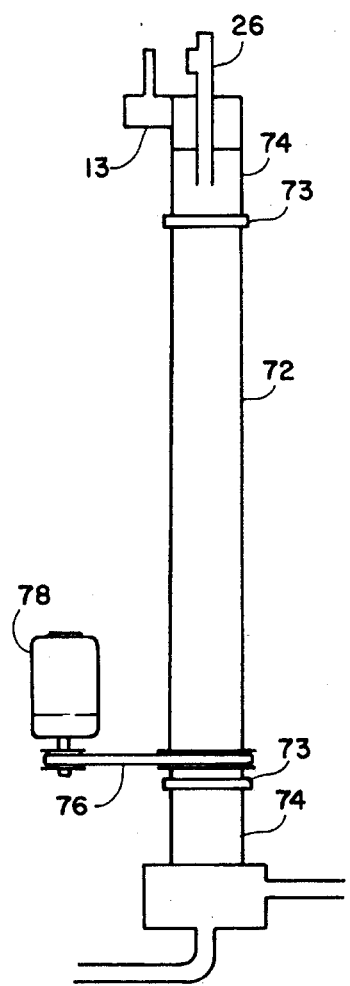
FIG. 10 is a schematic elevation view showing an arrangement for rotating part of the separation chamber to increase the vortex.

FIG. 10 schematically illustrates another arrangement for increasing the vortex without need for jets 12 as shown in FIGS. 1, 3 and 4. A central section 70 of chamber 10 is connected to two stationary end chamber sections 72 through conventional rotating seals 73. A motor 76 rotates central section 70 through a belt drive 78. As center section 70 rotates, liquid within chamber section 70 will be entrained by friction with the inner section surface and reinforce the vortex. If desired, a roughened inner surfaces, baffles, etc may be used to increase liquid entrainment.

Figure 11:
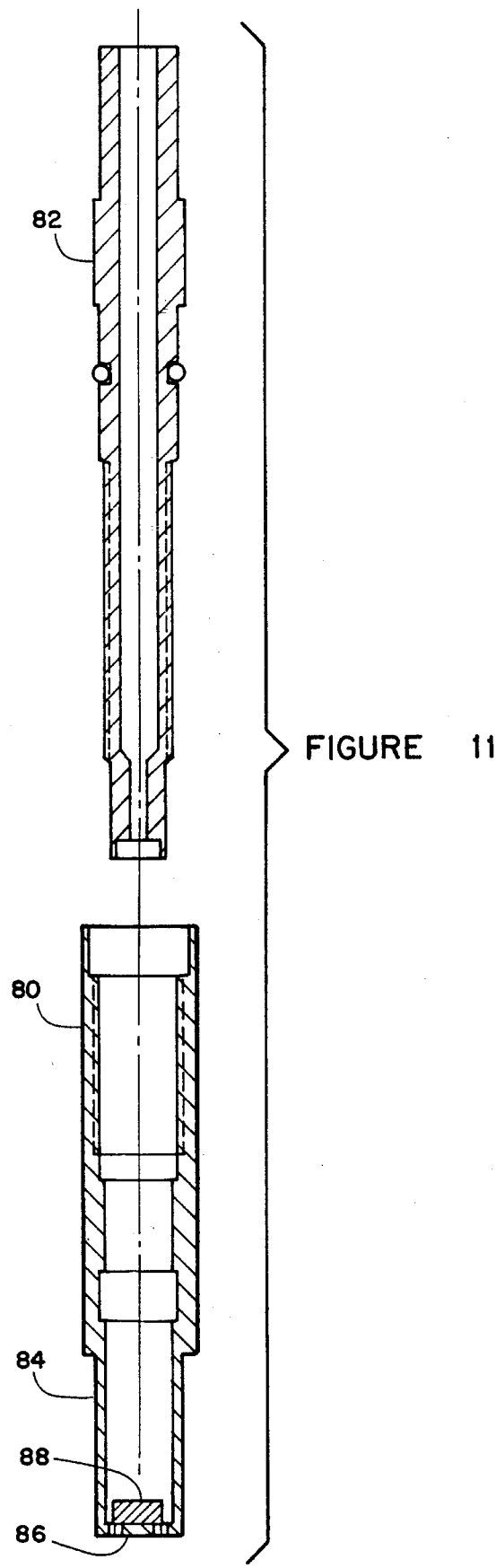
FIG. 11 shows detail axial sections through a jet nozzle shell and adjustment insert incorporating a piezo electric or ultrasonic actuator.

Details of a preferred nozzle for use with jets 12 are provided in FIG. 11, which shows axial sections through a nozzle outer shell 80 and insert 82. The output end 84 of shell 80 is secured in an opening in the wall of chamber 10 and insert 82 is placed therein and connected to a fluid source. The fluid (gas or gas saturated liquid) is sprayed through nozzle outlets 86. For optimum production of smallest diameter bubbles, it is preferred that a conventional piezo electric or ultrasonic actuator 88 be secured in shell 80 adjacent to outlets 86.

Figure 12:
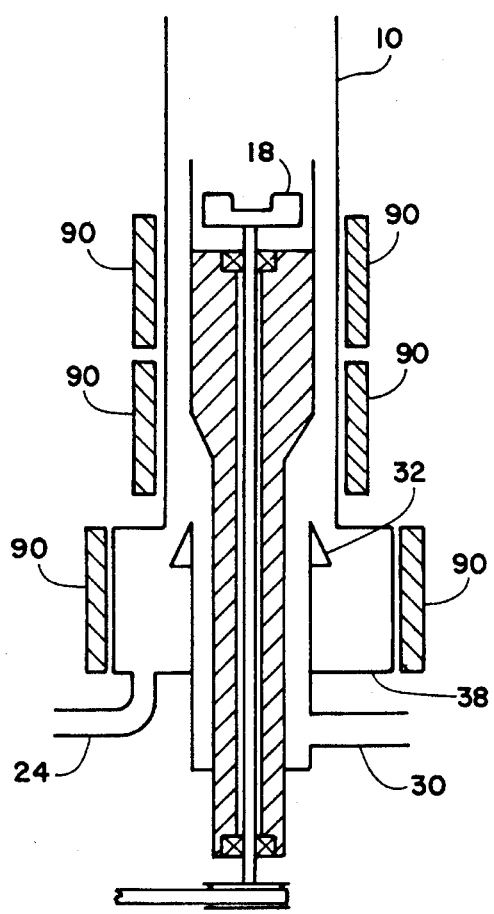
FIG. 12 is a schematic elevation view, partly cut away, illustrating the use of magnets to aid particle separation.

FIG. 12 is a detail view showing a preferred placement for magnets to aid in separation of heavy particles of magnetic material. Magnets 90 are preferably placed adjacent to chamber 10 near the lower end of the chamber and adjacent to housing 38. The magnets will aid baffles 32 in guiding heavy magnetic particles along the outer chamber and housing walls toward heavy particle outlet 24. The wall of chamber 10 and housing 38 adjacent to magnets 90 should be formed from non magnetic material. While any suitable magnets, either permanent magnets or electromagnets can be used, electromagnets are generally preferred since they can be turned off when not needed or to release any magnetic particles held too tightly to the inner walls of chamber 10 or housing 38.

While certain preferred materials, dimensions and arrangements have been described in detail in conjunction with the above description of preferred embodiments, those can be varied, where suitable, with similar results. Other applications, variations and ramifications of this invention will occur to those skilled in the art upon reading this disclosure. Those are intended to be included within the scope of this invention as defined in the appended claims.

We claim:

1. A vortex system for separating particles from a liquid stream which comprises:

an elongated, generally cylindrical chamber;

means at one end of said chamber for tangentially introducing a particle-bearing liquid into said chamber so that a vortex flow is established;

an axial impeller at one end of said chamber for reinforcing said vortex flow;

a plurality of injection jets along and through the outer wall of said chamber for introducing a fluid comprising a gas thereinto;

first effluent means at one end of said chamber for removing gas and light, fine and buoyant particles from the axial region of said chamber;

second effluent means at the end of said chamber opposite said one end for removing liquid and heavy particles from the outer region of said chamber;

third effluent means at the end of chamber opposite said one end for removing cleaned liquid from the annular region between said axial region and said outer region.

2. The vortex system for separating particles from a liquid stream according to claim 1 wherein said chamber has a length to diameter ratio of greater than 4.

3. The vortex system for separating particles from a liquid stream according to claim 1 wherein said chamber has a length to diameter ratio of from about 12 to 15.

4. The vortex system for separating particles from a liquid stream according to claim 1 wherein said means for introducing influent liquid into said chamber includes means for mixing a gas with said influent under pressure greater than the working pressure within said chamber.

5. The vortex system for separating particles from a liquid stream according to claim 1 further including venturi means for mixing a gas with a liquid and introducing said liquid into said influent liquid.

6. The vortex system for separating particles from a liquid stream according to claim 1 further including means for adjusting the axial position of said impeller in said chamber.

7. The vortex system for separating particles from a liquid stream according to claim 1 wherein said plurality of injection jets are positioned to inject said fluid along lines tangential to said chamber wall.

8. The vortex system for separating particles from a liquid stream according to claim 7 wherein said fluid is a gas and further including an actuator, selected from the group consisting of piezo electric and ultrasonic actuators, adjacent to the outlet ends of said jets for producing reduced diameter bubbles.

9. The vortex system for separating particles from a liquid stream according to claim 7 wherein said fluid is a liquid saturated with a gas at a pressure higher than the pressure within said chamber.

10. The vortex system for separating particles from a liquid stream according to claim 1 wherein about 1 jet is provided per linear inch along a selected length of the chamber.

11. The vortex system for separating particles from a liquid stream according to claim 1 wherein each of said jets is sized to provide a flow rate of from about 0.5 to 0.7 gallons per minute, and said jets together are configured to provide from about 1 to 50 per cent of the flow through said chamber.

12. The vortex system for separating particles from a liquid stream according to claim 1 further including baffle means between said second and third effluent means for aiding in directing heavy particles to said second effluent means.

13. The vortex system for separating particles from a liquid stream according to claim 1 further including magnet means along said chamber to aid in moving magnetic heavy particles toward the chamber wall.

14. The vortex system for separating particles from a liquid stream according to claim 1 further including at least one recycle pump means for withdrawing liquid through the chamber wall in the direction of vortex rotation and for reintroducing the withdrawn liquid into said chamber at in the direction of vortex rotation.

15. A vortex system for separating particles from a liquid stream which comprises:

an elongated, generally cylindrical chamber for positioning in a substantially vertical orientation in use;

means at the upper end of said chamber for tangentially introducing a particle-bearing liquid into said chamber so that a vortex flow is established;

an axial impeller at the upper end of said chamber for reinforcing said vortex flow;

a plurality of injection jets along and through the outer wall of said chamber for introducing a fluid comprising a gas thereinto;

first effluent means at the lower end of said chamber for removing gas and light, fine and buoyant particles from the axial region of said chamber;

second effluent means at the lower end of said chamber for removing liquid and heavy particles from the outer region of said chamber;

third effluent means at the lower end of said chamber for removing cleaned liquid from the annular region between said axial region and said outer region.

16. The vortex system for separating particles from a liquid stream according to claim 15 wherein said chamber has a length to diameter ratio of greater than 4.

17. The vortex system for separating particles from a liquid stream according to claim 15 wherein said chamber has a length to diameter ratio of from about 12 to 15.

18. The vortex system for separating particles from a liquid stream according to claim 15 wherein said means for introducing influent liquid into said chamber includes means for mixing a gas with said influent under pressure greater than the working pressure within said chamber.

19. The vortex system for separating particles from a liquid stream according to claim 15 further including venturi means for mixing a gas with a liquid and introducing said liquid into said influent liquid.

20. The vortex system for separating particles from a liquid stream according to claim 15 further including means for adjusting the axial position of said impeller in said chamber.

21. The vortex system for separating particles from a liquid stream according to claim 15 wherein said plurality of injection jets are positioned to inject said fluid along lines tangential to said chamber wall.

22. The vortex system for separating particles from a liquid stream according to claim 21 wherein said fluid is a gas and further including an actuator, selected from the group consisting of piezo electric and ultrasonic actuators, adjacent to the outlet ends of said jets for producing reduced diameter bubbles.

23. The vortex system for separating particles from a liquid stream according to claim 21 wherein said fluid is a liquid saturated with a gas at a pressure higher than the pressure within said chamber.

24. The vortex system for separating particles from a liquid stream according to claim 15 wherein at least 1 jet is provided per linear inch along a selected length of the chamber.

25. The vortex system for separating particles from a liquid stream according to claim 15 wherein each of said jets is sized to provide a flow rate of from about 0.5 to 0.7 gallons per minute, and said jets together are configured to provide from about 1 to 50 per cent of the flow through said chamber.

26. The vortex system for separating particles from a liquid stream according to claim 15 further including baffle means between said second and third effluent means for aiding in directing heavy particles to said second effluent means.

27. The vortex system for separating particles from a liquid stream according to claim 15 further including magnet means along said chamber to aid in moving magnetic heavy particles toward the chamber wall.

28. The vortex system for separating particles from a liquid stream according to claim 15 further including at least one recycle pump means for withdrawing liquid through the chamber wall in the direction of vortex rotation and for reintroducing the withdrawn liquid into said chamber at in the direction of vortex rotation.

29. A vortex system for separating particles from a liquid stream which comprises:

an elongated, generally cylindrical chamber for positioning in a substantially vertical orientation in use;

means at the lower end of said chamber for tangentially introducing a particle-bearing liquid into said chamber so that a vortex flow is established;

an axial impeller at the lower end of said chamber for reinforcing said vortex flow;

a plurality of injection jets along and through the outer wall of said chamber for introducing a fluid comprising a gas thereinto;

first effluent means at the upper end of said chamber for removing gas and light, fine and buoyant particles from the axial region of said chamber;

second effluent means at the upper end of said chamber for removing liquid and heavy particles from the outer region of said chamber;

third effluent means at the upper end of said chamber for removing cleaned liquid from the annular region between said axial region and said outer region.

30. The vortex system for separating particles from a liquid stream according to claim 29 wherein said chamber has a length to diameter ratio of greater than 4.

31. The vortex system for separating particles from a liquid stream according to claim 29 wherein said chamber has a length to diameter ratio of from about 12 to 15.

32. The vortex system for separating particles from a liquid stream according to claim 29 wherein said means for introducing influent liquid into said chamber includes means for mixing a gas with said influent under pressure greater than the working pressure within said chamber.

33. The vortex system for separating particles from a liquid stream according to claim 29 further including venturi means for mixing a gas with a liquid and introducing said liquid into said influent liquid.

34. The vortex system for separating particles from a liquid stream according to claim 29 further including means for adjusting the axial position of said impeller in said chamber.

35. The vortex system for separating particles from a liquid stream according to claim 29 wherein said plurality of injection jets are positioned to inject said fluid along lines tangential to said chamber wall.

36. The vortex system for separating particles from a liquid stream according to claim 35 wherein said fluid is a gas and further including an actuator, selected from the group consisting of piezo electric and ultrasonic actuators, adjacent to the outlet ends of said jets for producing reduced diameter bubbles.

37. The vortex system for separating particles from a liquid stream according to claim 35 wherein said fluid is a liquid saturated with a gas at a pressure higher than the pressure within said chamber.

38. The vortex system for separating particles from a liquid stream according to claim 29 wherein at least 1 jet is provided per linear inch along a selected length of the chamber.

39. The vortex system for separating particles from a liquid stream according to claim 29 wherein each of said jets is sized to provide a flow rate of from about 0.5 to 0.7 gallons per minute, and said jets together are configured to provide from about 1 to 50 per cent of the flow through said chamber.

40. The vortex system for separating particles from a liquid stream according to claim 29 further including baffle means between said second and third effluent means for aiding in directing heavy particles to said second effluent means.

41. The vortex system for separating particles from a liquid stream according to claim 29 further including magnet means along said chamber to aid in moving magnetic heavy particles toward the chamber wall.

42. A vortex system for separating particles from a liquid stream which comprises:

an elongated, generally cylindrical chamber for positioning in a substantially vertical orientation in use;

means at the upper end of said chamber for tangentially introducing a particle-bearing liquid into said chamber so that a vortex flow is established;

an axial impeller at the lower end of said chamber for reinforcing said vortex flow;

a plurality of injection jets along and through the outer wall of said chamber for introducing a fluid comprising a gas thereinto;

first effluent means at the upper end of said chamber for removing gas and light, fine and buoyant particles from the axial region of said chamber;

second effluent means at the lower end of said chamber for removing liquid and heavy particles from the outer region of said chamber;

third effluent means at the lower end of said chamber for removing cleaned liquid from the annular region between said axial region and said outer region.

43. The vortex system for separating particles from a liquid stream according to claim 42 wherein said chamber has a length to diameter ratio of greater than 4.

44. The vortex system for separating particles from a liquid stream according to claim 42 wherein said chamber has a length to diameter ratio of from about 12 to 15.

45. The vortex system for separating particles from a liquid stream according to claim 42 wherein said means for introducing influent liquid into said chamber includes means for mixing a gas with said influent under pressure greater than the working pressure within said chamber.

46. The vortex system for separating particles from a liquid stream according to claim 42 further including venturi means for mixing a gas with a liquid and introducing said liquid into said influent liquid.

47. The vortex system for separating particles from a liquid stream according to claim 42 further including means for adjusting the axial position of said impeller in said chamber.

48. The vortex system for separating particles from a liquid stream according to claim 42 wherein said plurality of injection jets are positioned to inject said fluid along lines tangential to said chamber wall.

49. The vortex system for separating particles from a liquid stream according to claim 48 wherein said fluid is a gas and further including an actuator, selected from the group consisting of piezo electric and ultrasonic actuators, adjacent to the outlet ends of said jets for producing reduced diameter bubbles.

50. The vortex system for separating particles from a liquid stream according to claim 48 wherein said fluid is a liquid saturated with a gas at a pressure higher than the pressure within said chamber.

51. The vortex system for separating particles from a liquid stream according to claim 42 wherein from about 3 to 10 jets are provided per linear inch along a selected length of the chamber.

52. The vortex system for separating particles from a liquid stream according to claim 42 wherein each of said jets is sized to provide a flow rate of from about 0.5 to 0.7 gallons per minute, and said jets together are configured to provide from about 1 to 50 per cent of the flow through said chamber.

53. The vortex system for separating particles from a liquid stream according to claim 42 further including baffle means between said second and third effluent means for aiding in directing heavy particles to said second effluent means.

54. The vortex system for separating particles from a liquid stream according to claim 42 further including magnet means along said chamber to aid in moving magnetic heavy particles toward the chamber wall.

\* \* \* \* \*